April 17, 1962

H. E. SMITH 3,029,703

LAUNCHER

Filed July 26, 1960

3 Sheets-Sheet 1

INVENTOR.
HOMER E. SMITH

BY

ATTORNEYS

April 17, 1962  H. E. SMITH  3,029,703
LAUNCHER
Filed July 26, 1960  3 Sheets-Sheet 2

INVENTOR.
HOMER E. SMITH
BY
*H. W. Lasche*
*Paul S. Collignon*
ATTORNEYS

April 17, 1962 H. E. SMITH 3,029,703
LAUNCHER
Filed July 26, 1960 3 Sheets-Sheet 3

INVENTOR.
HOMER E. SMITH
BY
H. H. Loesche
Paul S. Collignon
ATTORNEYS

United States Patent Office 3,029,703
Patented Apr. 17, 1962

3,029,703
LAUNCHER
Homer E. Smith, Indianapolis, Ind., assignor to the United States of America as represented by the Secretary of the Navy
Filed July 26, 1960, Ser. No. 45,511
2 Claims. (Cl. 89—1.5)
(Granted under Title 35, U.S. Code (1952), sec. 266)

The invention described herein may be manufactured and used by or for the Government of the United States of America for governmental purposes without the payment of any royalties thereon or therefor.

The present invention relates to a launching device and more particularly to a device for launching stores, such as sonobuoys, from an aircraft.

One method used in the past for launching sonobuoys from a moving aircraft has been by manual launching through a doorway, or bomb bay doors. Manual launching has several disadvantages, one being the problem of timing, as an operator cannot accurately disburse sonobuoys so that they will be confined to a desired area. Also, there is a problem of clearance involved, as it is necessary that the sonobuoys do not strike or hit any part of the aircraft as they are dispersed. Still another disadvantage of manual launching has been the orientation of the sonobuoy as it is tossed into the slipstream. The velocity of the outside air causes the sonobuoy to tumble and fall erratic, and the rotochute is often damaged.

The present invention provides a novel device for launching sonobuoys in a horizontal position with an initial velocity from an aircraft. A slidable carriage is provided with pivotal jaws that hold a sonobuoy during downward travel. At the release point, the jaws are cammed open and the carriage is then arrested and returned to its starting position. The carriage jaws are adaptable for holding the sonobuoy in a horizontal position from which it is released.

It is therefore a general object of the present invention to provide an improved device for launching stores from a moving aircraft.

Another object of the present invention is to launch a sonobuoy in a horizontal position from a moving aircraft.

Still another object of the present invention is to launch a sonobuoy with an initial velocity from an aircraft.

Figure 1:
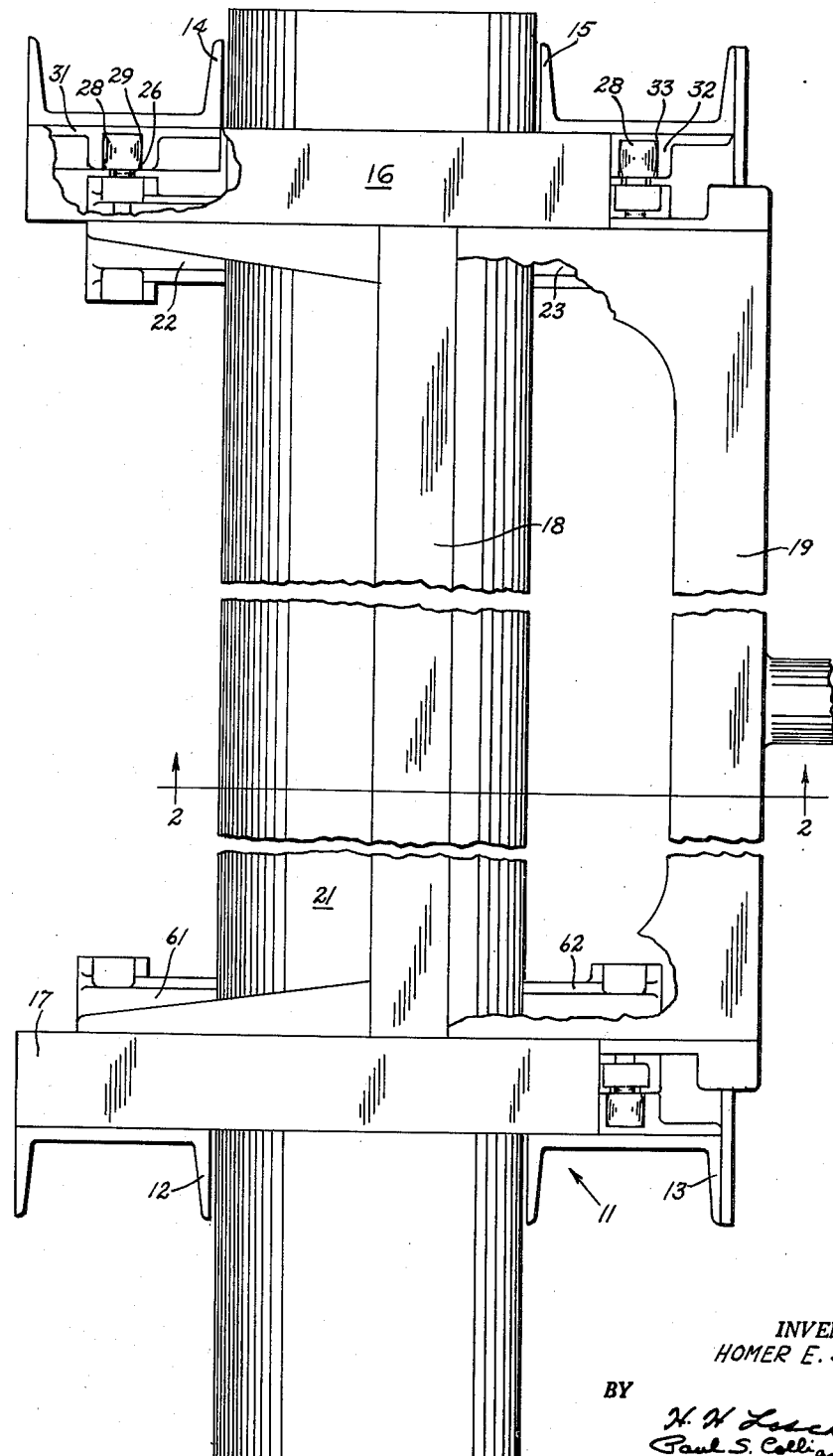
Figure 2:
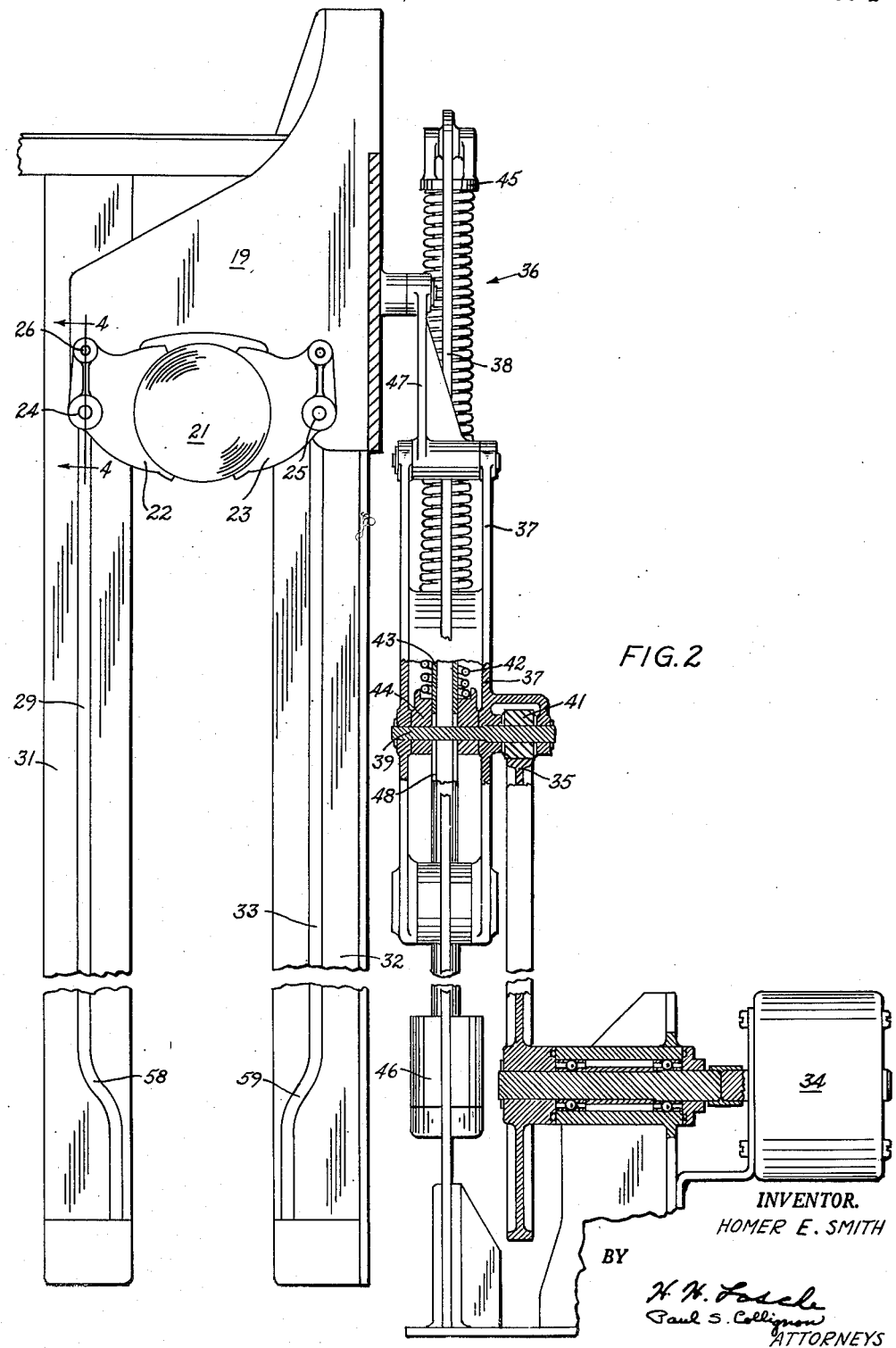
Figure 3:
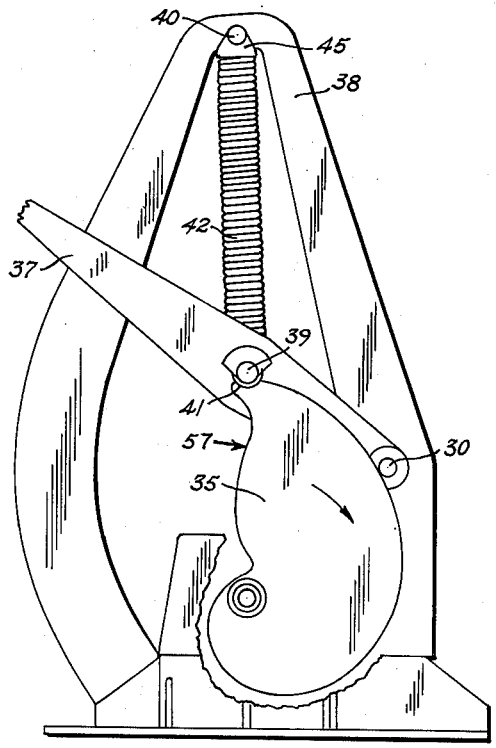
Figure 4:
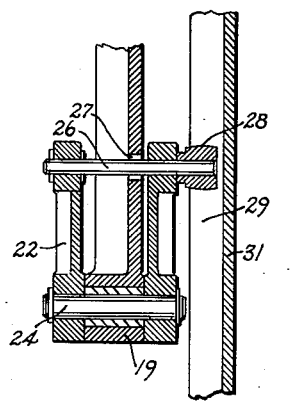
Figure 5:
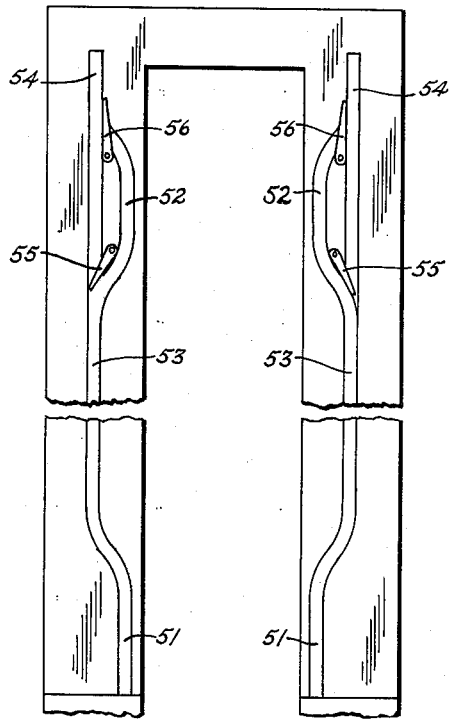

Other objects and advantages of the present invention will be readily appreciated as the same becomes better understood by reference to the following detailed description when considered in connection with the accompanying drawings wherein:

FIG. 1 is a partial top view showing a preferred embodiment of the present invention;
FIG. 2 is a front view taken along line 2—2 of FIG. 1;
FIG. 3 is a side view of a preferred embodiment;
FIG. 4 is a partial sectional view taken on line 4—4 of FIG. 2; and
FIG. 5 is a diagrammatic view showing a second embodiment of cam groove arrangements.

Referring now to the drawings, and particularly to FIGS. 1 and 2, there is shown a frame 11 which consists of channels 12 through 15 and braces 16 through 18. A carriage 19 is slidably attached to frame 11, and first and second pairs of jaws are pivotally attached to carriage 19 to hold a sonobuoy 21.

Referring particularly to FIGS. 2 and 4 of the drawings, one of the pairs of jaws are shown in a closed position. Jaws 22 and 23 are pivotally attached to carriage 19 by means of shafts 24 and 25, respectively. A follower shaft 26 is attached to each jaw and passes through an arcuate slot 27 in carriage 19. A follower wheel 28 is rotatably supported on shaft 26 and engages in cam groove 29 located in vertical cam plate 31. A second cam plate 32 is also provided with a cam groove 33 which is engageable with a follower wheel that causes jaw 23 to be actuated. As can be seen in FIG. 2 of the drawings, both cam grooves 29 and 33 shift inwardly at the lower ends of the plates, that is, the spacing between the two cam grooves is reduced.

The upward and downward travel of carriage 19 is controlled by motor 34 through cam 35 and the spring mechanism 36. Follower arm 37 is pivotally attached to stationary frame 38 by means of pin 30, and shaft 39 is attached to the follower arm 37. A follower wheel 41 is rotatably mounted on shaft 39 and engages cam 35. Spring 42 surrounds spring shaft 43, and is retained between spring seat 44 and pivot plate 45 that is attached to frame 38 by means of pin 40. Shaft 43 is provided with slot 48 in order that shaft 39 can move in a longitudinal direction relative to shaft 43. Spring seat 44 is held in position with follower arm 37 by shaft 39. A resilient stop 46 is attached to the lower end portion of spring shaft 43 and is provided in order to limit the downward travel of spring seat 44. Follower arm 37 is connected to carriage 19 through crank arm 47 and any movement of follower arm 37 is transmitted to carriage 19.

In the embodiment shown in FIG. 2 of the drawings, jaws 22 and 23 remain closed until the carriage travels downwardly to a position where the jaws are cammed open by the action of followers 28 which are tracking in grooves 29 and 33. FIG. 5 of the drawings shows another embodiment whereby the jaws are momentarily opened to aid the loading of a sonobuoy in the jaws, after which the jaws are closed, and remain closed, until the carriage 19 reaches a position where the sonobuoy is to be released. A portion 51 of the cam groove causes the jaws to be opened for release of the sonobuoy and portion 52 causes the jaws to be opened for aiding in loading. When the follower wheel 28 is in portions 53 and 54, the jaws are closed. Gates 55 and 56, which might be spring leaves, are provided in order that the follower wheel travels in the desired groove portion. When the follower wheel 28 is traveling upward, gate 55 causes the follower wheel 28 to travel from portion 53 of the groove into portion 52, and then into portion 54. On the downward travel, gate 56 prevents the follower wheel 28 from entering into portion 52 as it is desired that the cam jaws remain closed until the follower wheel reaches portion 51 of the groove.

In operation, the sonobuoy 21 is held in position by jaws 22 and 23, as shown in FIG. 2 of the drawings, and spring 42 is in a compressed condition, as shown in FIG. 3 of the drawings. When it is desired to release the sonobuoy 21, the operator, who might be a pilot of an aircraft, operates a switch that energizes motor 34, which in turn drives cam 35 in a direction shown by the arrow. Cam 35 has a flat portion 57 thereon which permits follower wheel 41 to be rapidly moved downwardly by the force of spring 42. Follower arm 37, which moves integrally with follower wheel 41, also rapidly moves downwardly, being pivoted about pin 30, and in turn carriage 19 is moved downwardly.

Jaws 22 and 23, which are pivotally attached to carriage 19, carry sonobuoy 21 downwardly, and when the follower wheels 28 enter portions 58 and 59 of grooves 29 and 33, respectively, the jaws are opened to release sonobuoy 21. It can thus be seen that the sonobuoy 21 is launched from the aircraft with an initial velocity.

Spring seat 44 is retarded by stop 46, which in turn stops follower arm 37 and carriage 19. As cam 35 is further rotated, cam wheel 41 is moved in an upward direction, and consequently, carriage 19 is raised to its starting position. Spring 42 is compressed, at the same time, and the device is ready for another cycle.

As shown in FIG. 1 of the drawings, channel 19 is U-shaped and carries a second set of jaws 61 and 62. The operation of jaws 61 and 62 is the same as the first pair of jaws 22 and 23. The second set of jaws is provided in order to stabilize the holding of the sonobuoy 21, which is relatively long.

While a spring mechanism 36 and cam arrangement is shown in the drawings for raising and lowering of the carriage 19, other means can also be employed. For example, an air cylinder, having a slidable piston, can be employed to raise and lower carriage 19.

It can thus be seen that the present invention provides a novel device for launching stores, such as sonobuoys, in a horizontal position with an initial velocity, from a moving aircraft.

Obviously many modifications and variations of the present invention are possible in the light of the above teachings. It is therefore to be understood that the invention may be practiced otherwise than as specifically described.

What is claimed is:

1. A device for launching an object from an aircraft comprising: a vertical upstanding frame, a U-shaped carriage slidably attached to said frame and having first and second parallel sides, a pair of jaws pivotally attached to each said side of said U-shaped carriage, a follower arm pivotally connected to said U-shaped carriage, cam means engaging said follower arm, means for rotating said cam means whereby rotation of said cam means translates said carriage in a vertical direction, a plurality of cam grooves grouped in pairs on said frame, and separate follower wheels pivotally connected to separate jaws and engaging separate cam grooves.

2. A device for launching an object from an aircraft as set forth in claim 1 wherein said follower arm is spring-biased against said cam means.

References Cited in the file of this patent
UNITED STATES PATENTS

| | | |
|---|---|---|
| 1,621,654 | Boos | Mar. 22, 1927 |
| 2,567,735 | Scott | Sept. 11, 1951 |
| 2,832,506 | Hatcher | Apr. 29, 1958 |
| 2,852,982 | Musser | Sept. 23, 1958 |
| 2,877,688 | Markil | Mar. 17, 1959 |